June 8, 1965 D. G. FAWKES 3,187,861
SELF-LOCKING ROTARY OPERATOR
Filed July 9, 1963 2 Sheets-Sheet 1

Inventor:
Donald G. Fawkes
By: Hofgren, Wegner, Allen,
Stellman & McCord
Attorneys June 8, 1965  D. G. FAWKES  3,187,861
SELF-LOCKING ROTARY OPERATOR
Filed July 9, 1963  2 Sheets-Sheet 2
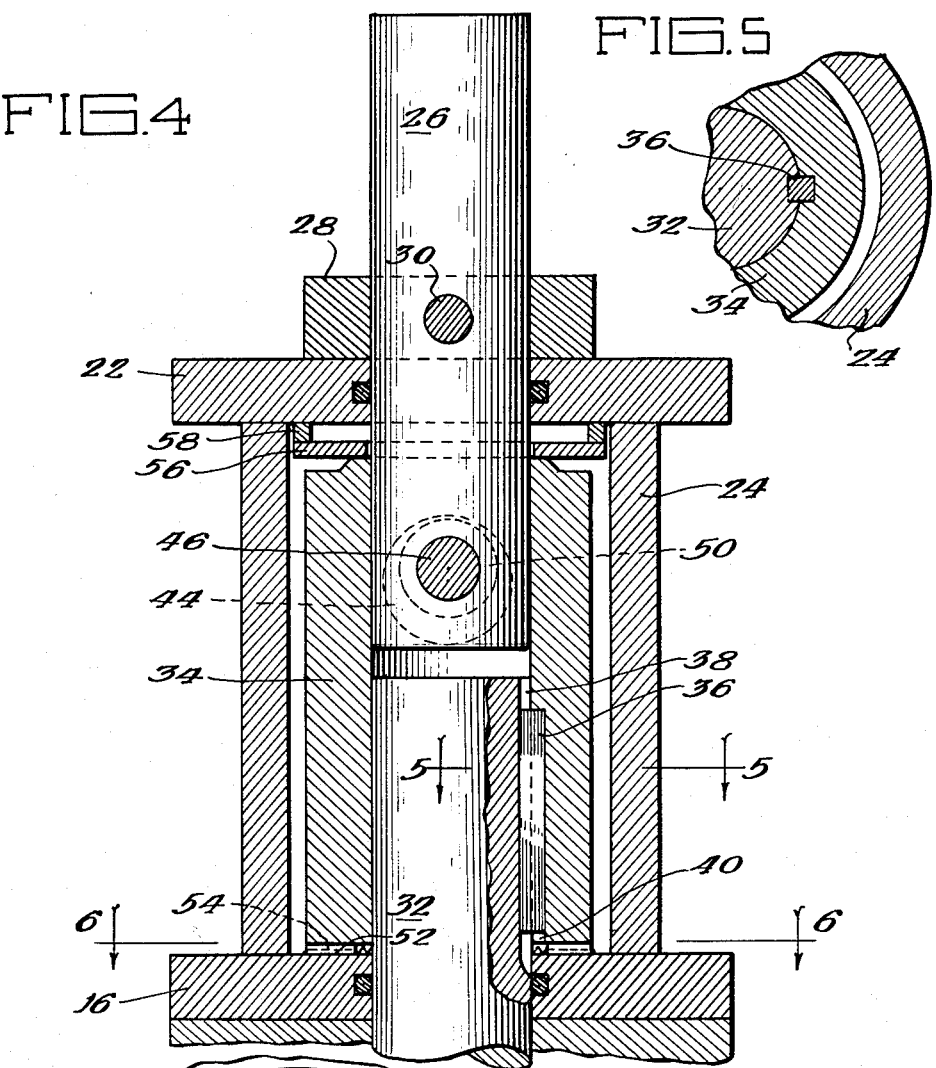
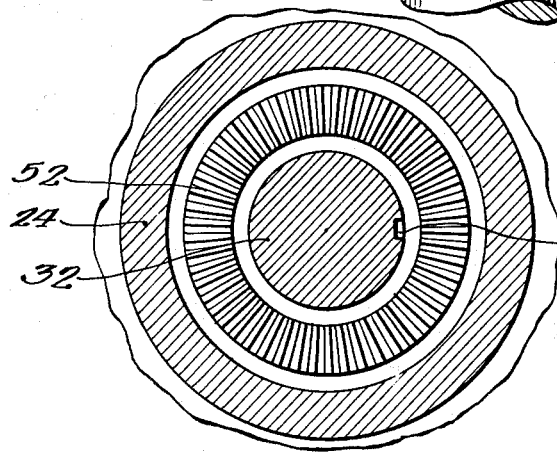

United States Patent Office 3,187,861
Patented June 8, 1965

3,187,861
SELF-LOCKING ROTARY OPERATOR
Donald G. Fawkes, Chicago, Ill., assignor to Henry Pratt Company, a corporation of Illinois
Filed July 9, 1963, Ser. No. 293,727
2 Claims. (Cl. 192—8)

This invention relates to an operator for a valve and more particularly to a rotary operator adapted to rotate the stem of a butterfly valve and lock the butterfly valve in any position between open and closed when torque is relaxed on the operator.

In a butterfly valve, the valve closure is generally in the form of a disc pivotally mounted on an axis perpendicular to the flow passage through a pipe line for controlling the flow of the fluid therethrough. When the valve closure is pivoted 90° from its closed position transverse of the fluid passageway, it is fully open and generally parallel to the direction of flow of fluid through the pipe line. The valve may have its closure set at any position between fully opened and fully closed to control the fluid flow. The flow of fluid about a partially open valve closure has a tendency to cause the closure member to be pivoted about its axis toward a fully opened or a fully closed position.

The present invention is directed to a rotary valve operator for opening and closing the valve closure disc of a butterfly valve which has incorporated therein means for maintaining the valve closure disc in any selected position.

It is the principal object of this invention to provide a new and improved rotary operator for a valve which will lock the valve closure disc in a selected position against the tendency of the valve closure disc to move from such selected position under the influence of fluid flow through the valve.

Another object of this invention resides in providing a rotary valve operator having an operator shaft, the rotation of which will unlock a valve closure disc from a locked position and pivot the closure disc to a selected position in which it will automatically be locked by the relaxation of the torque applied to the operator shaft.

A further object of this invention is to provide a self-locking rotary operator for a rotatable valve stem including a lock for the valve stem to render the same immovably locked relative to the valve housing and an operator having a shaft for alignment with the valve stem capable of sequentially unlocking the lock, rotating the valve stem and returning the valve stem to the locked relation, all automatically in response to torque applied to the operator shaft.

Further objects, features and advantages of the present invention will be apparent from the following description of a preferred embodiment illustrated in the accompanying drawings, in which:

FIGURE 4 is a cross-sectional view taken along line 4—4 of FIGURE 2 showing part of the valve stem broken away;

FIGURE 5 is a fragmentary cross-sectional view taken along line 5—5 of FIGURE 4; and FIGURE 6 is a cross-sectional view taken along line 6—6 of FIGURE 4.

Figure 1:
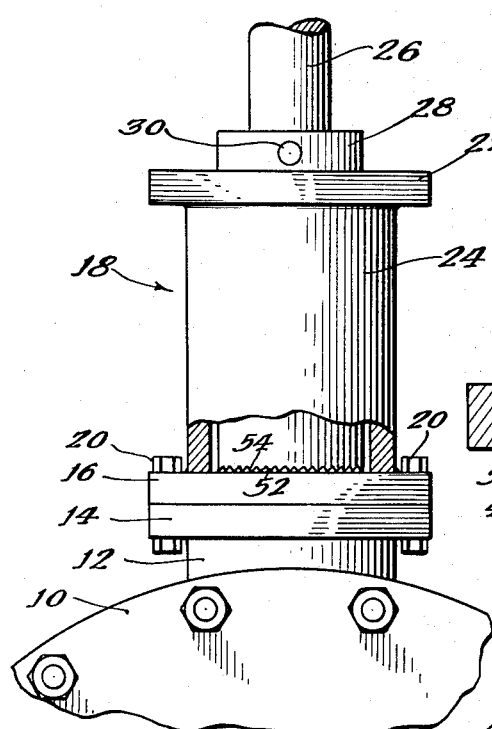
FIGURE 1 is a fragmentary elevational view showing the housing of the rotary valve operator embodying the invention with part of the housing broken away as attached to a butterfly valve.
Figure 2:
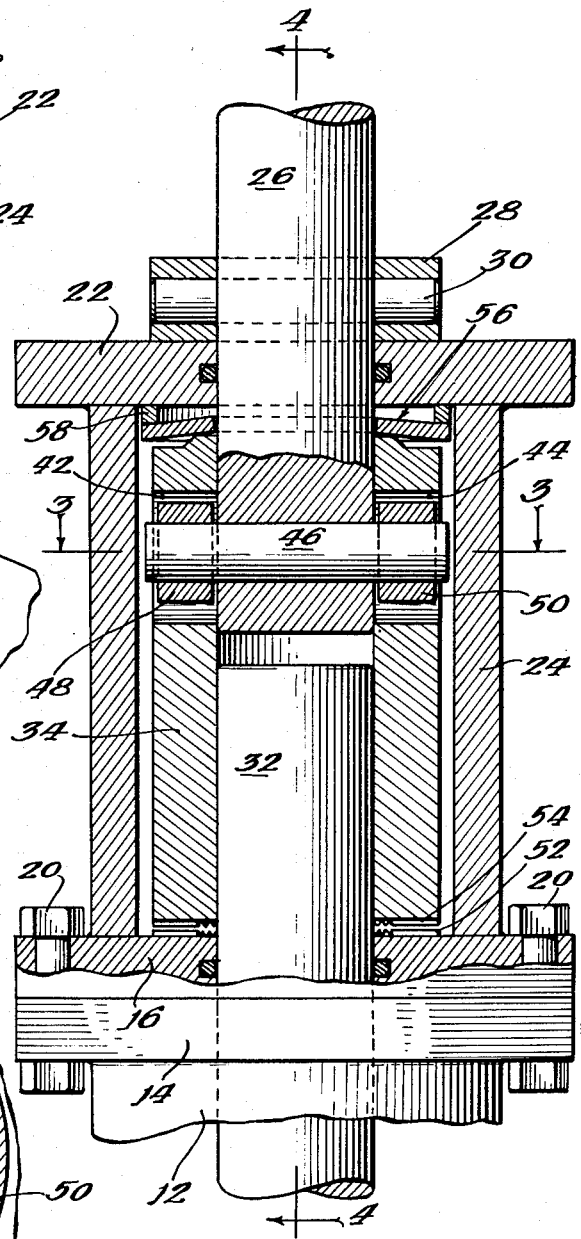
FIGURE 2 is a cross-sectional view through the longitudinal axis of the rotary valve operator showing the operator shaft, part of which is broken away and the associated valve parts.
Figure 3:
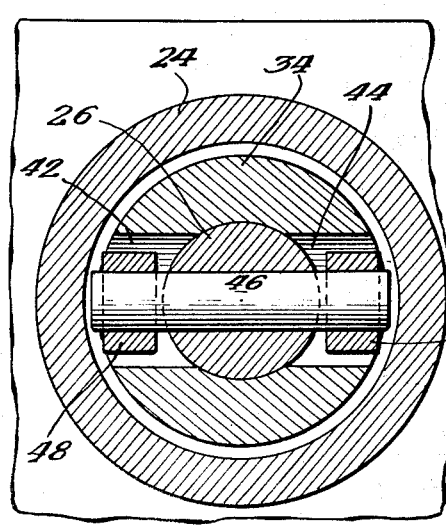
FIGURE 3 is a cross-sectional view taken along line 3—3 of FIGURE 2.

Referring to the drawings, in FIGURE 1 there is shown a section of a valve 10 having an upstanding portion 12 and a flange 14 adapted to mate with the bottom plate 16 of an operator housing shown generally at 18. The bottom plate 16 of housing 18 is secured to flange 14, as by bolts 20. The operator housing 18 has a top plate 22 and a cylindrical side wall 24. Preferred construction is that plates 16 and 22 and cylindrical barrel housing 18 are separate, held together by elongated tie rods in place of the shorter bolts 20.

A rotatable valve operator shaft 26 having a mounting washer 28 secured thereto as by pin 30, extends through top plate 22 into the valve operator housing 18. A valve stem 32, to which rotation is to be imparted, extends upwardly through bottom plate 16 in axial alignment with valve operator shaft 26. The valve stem 32 carries the butterfly valve closure disc (not shown) for opening and closing the fluid passageway.

The upper portion of valve stem 32 and the lower portion of valve operator shaft 26 are received within a valve stem sleeve 34. The valve stem sleeve 34 is keyed to the valve stem 32 for rotation therewith and to permit movement longitudinally thereof by key 36 received in keyway 38 of valve stem 32 and keyway 40 of valve stem sleeve 34.

The valve stem sleeve 34 has a pair of diametrically opposed openings 42 and 44 therein. In the form of operator shown, the openings are circular. A crosspin 46 is secured to the valve operator shaft 26 for rotation therewith and extends outwardly through the circular openings 42 and 44 in valve stem sleeve 34. The crosspin 46 carries a pair of rollers 48 and 50, respectively, within the openings 42 and 44. The circular openings 42 and 44 in the valve stem sleeve 34 have a diameter substantially larger than the rollers 48 and 50 and provide arcuate camming surfaces against which the rollers engage.

The bottom plate 16 of the operator housing 18 carries serrated locking means thereon in the form of a plurality of radially extending locking teeth 52 arranged in a concentric ring about the shaft 32. The bottom of valve stem sleeve 34 is formed with a plurality of radially extending locking teeth 54 adapted to mate with the serrated locking means 52 on plate 16 of the operator housing 18 to lock the valve stem 32 against rotation relative to the valve housing.

Resilient means are provided in the form of a spring washer 56 spaced from the top plate 22 of the valve housing by spacer ring 58. Spring washer 56 normally urges the valve stem sleeve 34 downwardly so that locking teeth 54 engage locking teeth 52 on the bottom plate 16 to lock the sleeve 34 and valve stem 32 against rotation relative to the operator housing 18.

To rotate the valve stem 32, torque is applied to the valve operator shaft 26 and transferred through crosspin 46 and rollers 48 and 50 to valve stem sleeve 34 and, in turn, to valve stem 32. Since the circular openings 42 and 44 are larger in diameter than the rollers 48 and 50, respectively, some lost motion is provided between the valve operator shaft 26 and the sleeve 34 to allow movement of the sleeve 34 longitudinally of the valve stem 32 and the operator housing prior to the turning of valve stem 32. As torque is applied to the valve operator shaft 26, the rollers 48 and 50 engage the arcuate camming surfaces of openings 42 and 44, respectively, and since the sleeve 34 is locked against rotation, the rollers ride the openings upwardly, camming the sleeve 34 upward against the resiliency of spring washer 56, thus disengaging the locking teeth 54 of sleeve 34 from the locking teeth 52 of bottom plate 16. When the spring washer 56 is deflected far enough to separate the locking teeth 54 from locking teeth 52, the sleeve 34 can rotate and turns with it the valve stem 32. The torque for turning the valve shaft is transmitted from the operator shaft 26 to the crosspin 46, the rollers 48 and 50, to the sleeve 34 and through the key 36 to the valve stem 32.

As soon as the torque is relaxed from the valve operator shaft 26, the spring washer 56 urges the valve stem sleeve 34 downward to engage the locking teeth 54 on the bottom plate 16 of the housing to lock the valve stem 32 in the selected position. A short reverse rotation of the operator shaft also occurs at this point. Thus, the valve closure disc of the butterfly valve (not shown), which is carried on the valve stem 32, is maintained in a selected position against the tendency of the valve closure member to move from this position under the influence of passage of fluid through the valve.

While an illustrative embodiment of the invention is shown in the drawings and described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

I claim:

1. A self-locking rotary operator for a rotatable valve stem, comprising: a valve operator housing having first serrated locking means thereon; a rotatable operator shaft in said housing axially aligned with said valve stem; a valve stem sleeve keyed to said valve stem for rotation therewith and limited movement longitudinally thereof, said sleeve having a pair of circular openings therein providing a pair of arcuate camming surfaces and having second serrated locking means on one end thereof adapted to mate with said first serrated locking means to lock said valve stem against rotation relative to said housing; a spring washer normally urging the second serrated locking means of said sleeve into locking engagement with said first serrated locking means of said housing; a cylindrical pin extending transversely of the operator shaft for rotation therewith and passing into said openings in said sleeve; a pair of rollers rotatably carried on said cylindrical pin within said openings, said sleeve being cammed longitudinally of the valve stem by the interaction of said rollers and said arcuate camming surfaces as said operator shaft is rotated whereby said second locking means is moved out of locking engagement with said first locking means, said rollers and said arcuate camming surfaces providing a lost motion connection between said operator shaft and said valve stem sleeve for imparting rotational movement to said valve stem.

2. A self-locking rotary operator for a rotatable valve stem, comprising: a rotatable operator shaft in a closed valve operator housing, said shaft being axially aligned with said valve stem; said housing having a first serrated locking means thereon and comprising a cylindrical side wall, a top plate having an opening through which said operator shaft extends, a bottom plate secured to a mating flange of the valve, said bottom plate having an opening through which the valve stem extends; a valve stem sleeve keyed to said valve stem for rotation therewith and limited movement longitudinally thereof, said sleeve having a pair of circular openings therein providing a pair of arcuate camming surfaces and having second serrated locking means on one end thereof adapted to mate with said first serrated locking means to lock said valve stem against rotation relative to said housing; means normally urging the second serrated locking means of said sleeve into locking engagement with said first serrated locking means of said housing; a pin extending transversely of the operator shaft for rotation therewith and passing into said openings in said sleeve; said sleeve being cammed longitudinally of the valve stem by the interaction of said pin and said camming surfaces as said operator shaft is rotated whereby said second locking means is moved out of locking engagement with said first locking means and then said valve stem is rotated, said pin and arcuate camming surfaces providing a lost motion connection between said operator shaft and said valve stem for imparting rotational movement to said valve stem.

References Cited by the Examiner

UNITED STATES PATENTS

| 1,708,616 | 4/29 | Grimm | 192—8 |
| 2,510,032 | 5/50 | Hood | 192—6 |
| 3,108,669 | 10/63 | Ateliani | 192—8 |
| 3,127,967 | 4/64 | Fawkes | 192—8 |

FOREIGN PATENTS

| 634,062 | 8/36 | Germany. |

DAVID J. WILLIAMOWSKY, *Primary Examiner.*